US006990352B2

(12) United States Patent
Pyhälammi et al.

(10) Patent No.: US 6,990,352 B2
(45) Date of Patent: Jan. 24, 2006

(54) GPRS SIGNALING VIA SMS MESSAGES

(75) Inventors: Seppo Pyhälammi, Helsinki (FI); Jussi Mäki, Espoo (FI)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 10/263,193

(22) Filed: Oct. 3, 2002

(65) Prior Publication Data

US 2004/0067761 A1    Apr. 8, 2004

(51) Int. Cl.
 H04Q 7/20    (2006.01)
(52) U.S. Cl. ........................ 455/466; 455/458
(58) Field of Classification Search ............. 455/435.1, 455/450, 466
See application file for complete search history.

(56) References Cited

U.S. PATENT DOCUMENTS

| | | | |
|---|---|---|---|
| 4,449,248 A | 5/1984 | Leslie et al. | |
| 5,038,401 A | 8/1991 | Inotsume | |
| 5,539,925 A | 7/1996 | Yli-Kotila et al. | |
| 5,745,860 A | 4/1998 | Kallin | |
| 5,761,606 A | 6/1998 | Wolzien | |
| 5,812,931 A | 9/1998 | Yuen | |
| 5,946,444 A | 8/1999 | Evans et al. | |
| 6,047,194 A * | 4/2000 | Andersson | 455/466 |
| 6,172,673 B1 | 1/2001 | Lehtinen et al. | |
| 6,230,325 B1 | 5/2001 | Iinuma et al. | |
| 6,308,267 B1 * | 10/2001 | Gremmelmaier | 713/168 |
| 6,437,836 B1 | 8/2002 | Huang et al. | |
| 6,636,502 B1 * | 10/2003 | Lager et al. | 370/352 |
| 6,687,252 B1 * | 2/2004 | Bertrand et al. | 370/401 |
| 2001/0015977 A1 * | 8/2001 | Johansson | 370/392 |
| 2002/0010763 A1 | 1/2002 | Salo et al. | |
| 2002/0047916 A1 | 4/2002 | Miyagi et al. | |
| 2002/0049059 A1 | 4/2002 | Soininen et al. | |
| 2002/0058494 A1 | 5/2002 | Timonen et al. | |
| 2002/0082048 A1 * | 6/2002 | Toyoshima | 455/557 |
| 2003/0081145 A1 | 5/2003 | Seaman et al. | |
| 2003/0142654 A1 | 7/2003 | Chambers et al. | |
| 2003/0214970 A1 * | 11/2003 | Pimentel | 370/465 |

FOREIGN PATENT DOCUMENTS

| | | |
|---|---|---|
| DE | 4422015 C1 | 8/1995 |
| EP | 0115038 | 8/1984 |
| EP | 0569311 | 11/1993 |
| EP | 0999678 | 5/2000 |
| EP | 1059809 | 12/2000 |
| EP | 1107209 | 6/2001 |
| EP | 1331786 | 7/2003 |
| GB | 2294132 | 4/1996 |

(Continued)

OTHER PUBLICATIONS

Search Report.
"Datenrundfunk mit DAB", Technik, 202 Funkschau, Oct. 13, 1995, Poing, DE, pp. 45-48.

(Continued)

Primary Examiner—George Eng
Assistant Examiner—Julie E Stein
(74) Attorney, Agent, or Firm—Banner & Witcoff, LTD

(57) ABSTRACT

A method and system for establishing a data connection between two devices over a mobile telecommunications network is provided. A mobile terminal can establish a data connection with a second device by establishing a GPRS connection and obtaining an IP address. The mobile terminal sends an SMS message including its IP address to the second device. The second device also establishes a GPRS connection and obtains an IP address, and then sends a return SMS message including the second device's IP address to the mobile terminal. Once the two devices have exchanged IP address information, they jointly set up a data connection to transfer data, e.g., image files.

23 Claims, 4 Drawing Sheets

FOREIGN PATENT DOCUMENTS

| | | |
|---|---|---|
| GB | 2307628 | 5/1997 |
| GB | 2379116 | 2/2003 |
| WO | WO 96/42144 | 12/1996 |
| WO | WO 98/52105 | 11/1998 |
| WO | WO 99/04568 | 1/1999 |
| WO | WO 99/12365 * | 3/1999 |
| WO | WO 00/44168 | 7/2000 |
| WO | WO 00/57657 | 9/2000 |
| WO | WO 01/15450 | 3/2001 |
| WO | WO 01/48715 | 7/2001 |
| WO | WO 02/03698 | 1/2002 |
| WO | WO 02/32115 | 4/2002 |
| WO | WO-02/085004 | 10/2002 |
| WO | WO-03/04712 | 6/2003 |

OTHER PUBLICATIONS

Complete translation into English of pp. 45-48 of "Datenrundfunk mit DAB" entitled :Data Broadcasting With DAB, Technology, 202 Funkschau, Oct. 13, 1995, Poing, Germany.

English language Abstract of pp. 45-48 of Datenrundfunk mit DAB, Technik, 202 Funkschau, Oct. 13, 1995, Poing, DE.

Akiwumi-Assani et al., :Multi-media Terminal Architecture, Philips Journal of Research, vol. 50, No. 1, Jan. 1996, pp. 169-184.

Balakrishnan et al., "Digital Video And The National Information Infrastructure", Philips Journal of Research, vol. 500, No. 1, Jan. 1996, pp. 105-129.

Salkintzis et al., "An In-Band Power-Saving Protocol For Mobile Data Networks", IEEE Transactions on Communications, vol. 46, No. 9, Sep., 1998, pp. 1194-1205.

Salkintzis et al., "Performance Analysis Of A Downlink MAC Protocol With Power-Saving Support", IEEE Transactions on Vehicular Technology, vol. 49, No. 3, May 2002, pp. 1029-1040.

Datenrundfunk mit DAB, Technik, 202 Funkschau, Oct. 1995.

* cited by examiner

GPRS SIGNALING VIA SMS MESSAGES

FIELD OF THE INVENTION

The invention relates generally to mobile telecommunications networks. More specifically, the invention provides a method and system for a mobile terminal to establish a data connection with another device.

BACKGROUND OF THE INVENTION

General packet radio service (GPRS) provides data connection service for Global System for Mobile Communications (GSM) telecommunications networks. When a mobile terminal requests a GPRS connection, the mobile terminal typically receives a dynamic IP address from a DHCP server on the GPRS operator's IP backbone. Alternatively, the mobile terminal may receive a public IP address for communication over a public network, such as the Internet, or the mobile terminal may receive a local IP address for communication in a local area network (LAN). The mobile terminal can then use the assigned IP address for subsequent data communications, such as browsing the Internet. However, it is difficult for mobile terminals to use the IP address to exchange data with another device, such as an image file server, because there is no mechanism through which one mobile terminal can learn the IP address of another mobile terminal or data processing device.

One known solution that is expected to allow a mobile terminal to establish a data connection with another mobile terminal is the advent of IPv6. IPv6 is expected to allow mobile terminals to establish direct data connections with one another using GPRS service. However, IPv6 is not in widespread use, resulting in terminals not being able to readily take advantage of the capabilities of IPv6 in order to establish data connections. Until IPv6 is in use, data connections between mobile terminals and between a mobile terminal and another device (e.g., a file server or local computer) are not possible without using an alternative connection establishing protocol such as session initiation protocol (SIP). SIP, however, is intended for 3G networks and terminals, so currently available GSM and other network services and terminals do not support SIP.

Thus, it would be an advancement in the art to provide a method and system for a mobile terminal to establish a data connection with another device, without the need to rely on IPv6 or SIP.

BRIEF SUMMARY OF THE INVENTION

To overcome limitations in the prior art described above, and to overcome other limitations that will be apparent upon reading and understanding the present specification, the present invention is directed to a mobile terminal establishing a data connection with a second device by using SMS messages to exchange GPRS signaling information. The mobile terminal, upon establishing a GPRS connection through a telecommunications network, receives an IP address. The mobile terminal sends its IP address to the second device via an SMS message addressed to the second device. The second device receives an IP address either by establishing its own GPRS connection or by prior assignment, and sends its IP address back to the mobile terminal via another SMS message. Once the two devices have exchanged IP address information, the two devices can establish a direct data connection with one another.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
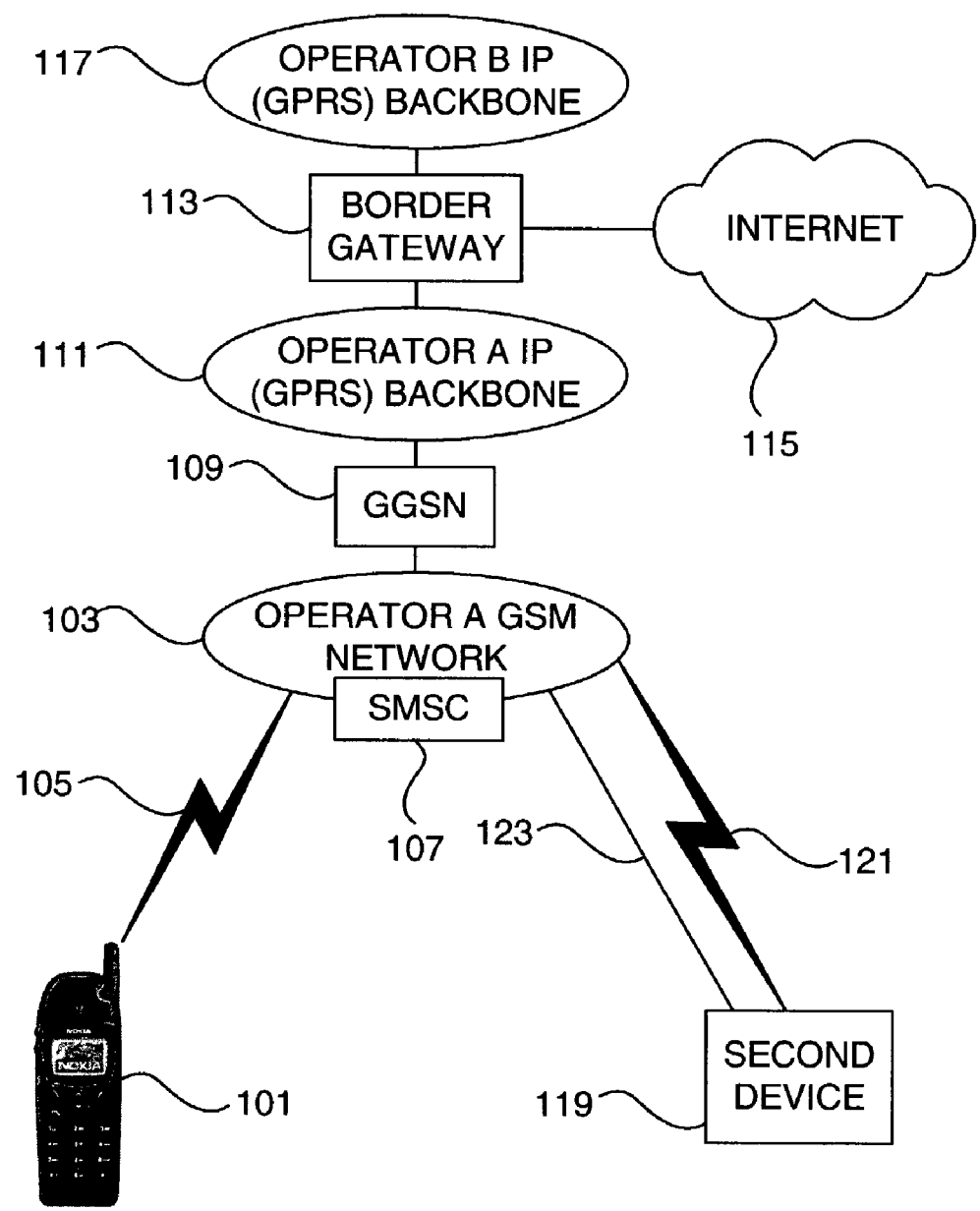
FIG. 1 illustrates a block diagram of a network system according to an illustrative embodiment of the invention.

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention. FIG. 1 illustrates a block diagram of a system in which short message service (SMS) messages can be used to establish a GPRS data connection between two devices. A mobile terminal 101 connects to a mobile operator's GSM mobile telecommunications network 103 via wireless communications link 105. Alternatively (not shown), network 103 may be a CDMA network, TDMA network, or other wireless communications network. On GSM network 103 resides a short message service center (SMSC) 107, which handles SMS messages to and from mobile terminals. SMSC's are known in the art, as are the handling and transmission of SMS messages. Those of skill in the art will appreciate that other data connection models and architectures, e.g., GSM data connections may use High-speed Circuit Switched Data (HCSD), or other data connections, instead of or in addition to GPRS.

The GSM network 103 is connected to a gateway GPRS support node (GGSN) 109, which connects the network 103 to an IP backbone network 111. A GGSN acts as an interface between the GPRS backbone (in this example, IP network 111) and external networks (in this example, GSM network 103). The GGSN converts GPRS packets coming from the external network into an appropriate packet data protocol (PDP) format (e.g. IP or X.25) and sends them out on the corresponding packet data network, i.e., the IP backbone 111. In the other direction, the GGSN converts PDP addresses of incoming data packets to the GSM address of the destination user, and sends the readdressed packets to the responsible external network, i.e., GSM network 103. The GGSN may store the current GSM address of the user and his or her profile in memory, and may also perform authentication and charging functions. GSM network 103 may also include one or more serving GPRS support nodes (SGSN, not shown) to handle GPRS traffic in the GSM network, as is known in the art.

IP backbone network 111 may be connected to a border gateway 113, which can further route data to another network, such as the Internet 115 or another operator's data network 117.

Also connected to telecommunications network 103 is a second device 119 via wireless connection 121 or physical connection 123. Second device 119 may be another mobile terminal, a computer acting as a file server, or any other device that has or can obtain an IP address and that has SMS message capabilitiy (i.e., has a telephone number). Second device 119 may logically be connected to GGSN 109 using a GPRS tunnel protocol (GTP) tunnel through telecommunications network 103.

Figure 2:
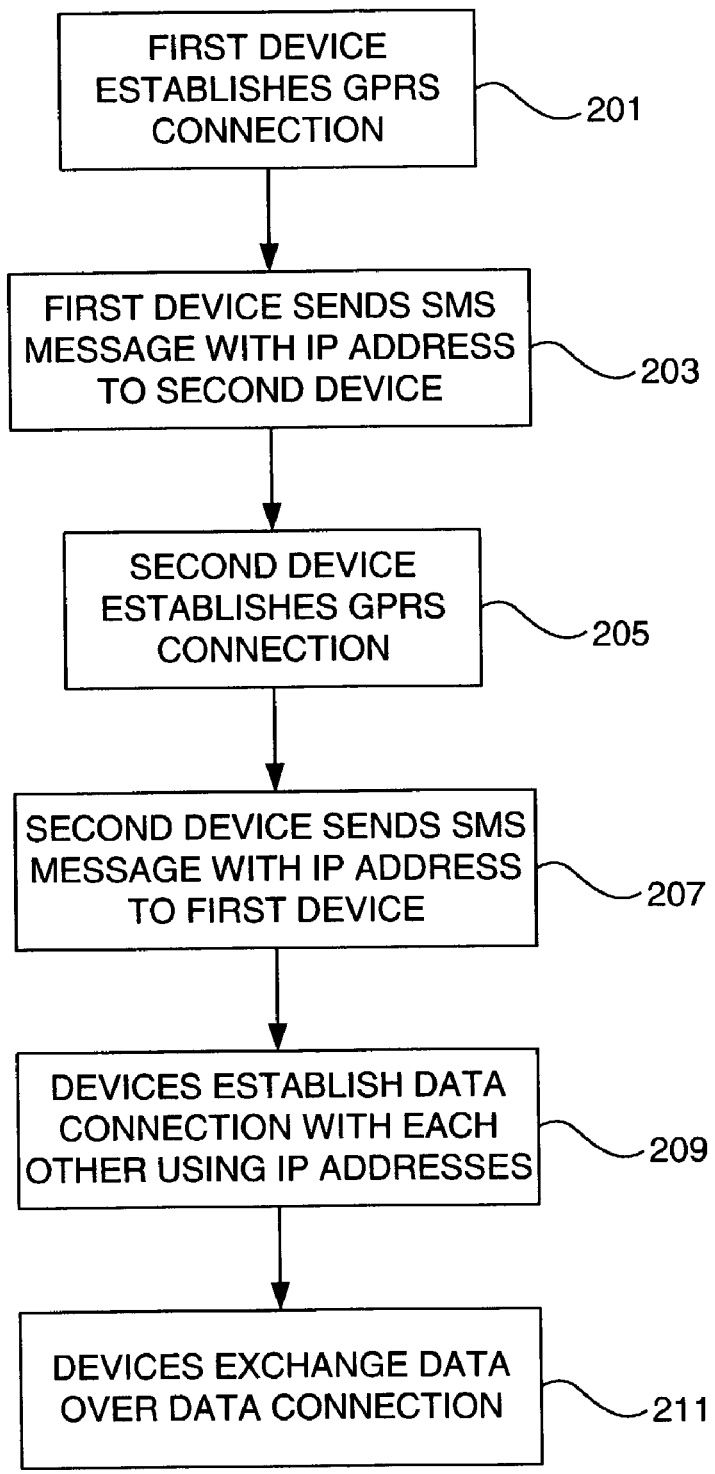
FIG. 2 illustrates a method for establishing a data connection between two devices connected to the network system illustrated in FIG. 1.

With further reference to FIG. 2, the invention provides a method for establishing a data connection between two devices using SMS messages, without requiring the use of IPv6 or session initiation protocol (SIP). After mobile terminal 101 (or the user operating the mobile terminal) determines the need to establish a data connection with another device, mobile terminal 101 in step 201 establishes a GPRS connection through GGSN 109 with IP network 111. As part of the connection establishing procedures, mobile terminal 101 receives an IP address, e.g., from a DHCP server (not shown) on data network 111, as provided for in the GPRS specification promulgated by the European Telecommunications Standards Institute (ETSI) of Sophia Antipolis, France.

Upon receiving an IP address, mobile terminal 101 in step 203 sends an SMS message to a second device 119 via SMSC 107. The second device may be any device with which the first device desires to establish a data connection, and that has SMS message and GPRS connection capability and that is connected (wired or wireless) to the network 103. Included in the SMS message is the IP address of the first device as received in step 201.

In step 205 the second device 119 establishes a GPRS connection through GGSN 109 with IP network 111, similar to mobile terminal 101 in step 201. As part of the GPRS connection establishing procedures, second device 119 receives an IP address from data network 111, e.g., via a DHCP server. One of skill in the art will appreciate that mobile terminal 101 and/or second device 119 may already be connected to the data network via a GPRS connection. In such a scenario, one or both of the GPRS establishing steps may be skipped, as appropriate.

Upon receiving an IP address, second device 119 in step 207 sends a SMS message back to mobile terminal 101. The SMS message sent back to mobile terminal 101 includes the IP address of second device 119. In step 209, the devices establish a direct data connection using the IP address information obtained in step 201–207. The data connection may be established using TCP, UDP, or any other known transport protocol. Once the data connection has been established, in step 211 data (e.g., files) can be exchanged between the two devices.

Figure 3:
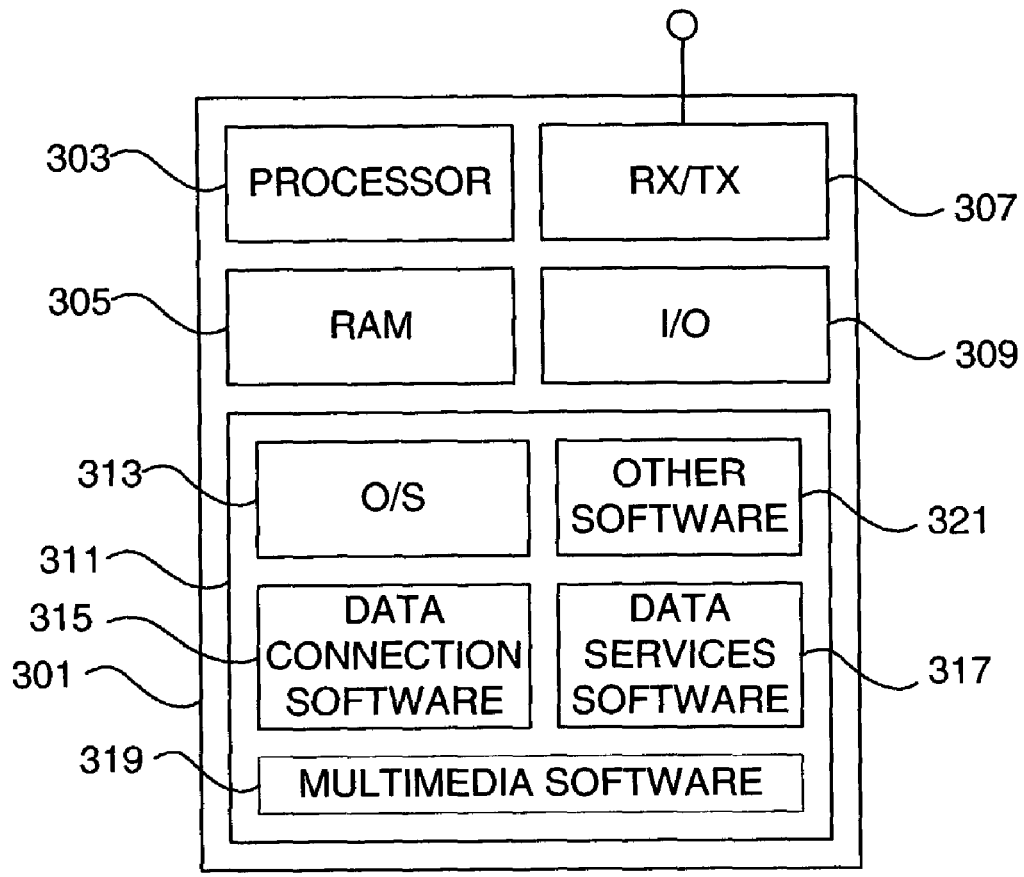
FIG. 3 illustrates a block diagram of a mobile terminal adapted to establish a data connection with another device according to an illustrative embodiment of the invention.

FIG. 3 illustrates a block diagram of a mobile terminal adapted to perform as described above. Mobile terminal 301 may be a mobile telephone, personal digital assistant (PDA), personal communication device such as the Nokia Communicator available from Nokia Corp. of Helsinki, Finland, or any combination or other mobile device with integrated wireless telecommunications capabilities. Mobile terminal 301 may include a processor 303, RAM 305, transceiver 307, I/O 309, and nonvolatile memory 311. I/O 309 may include one or more input and/or output devices such as input buttons, microphone, digital camera, speaker, display screen, and the like. Transceiver 307 is used to communicate with one or more wireless networks (e.g., network 103 in FIG. 1), and may include multiple communication mode capabilities, e.g., analog, digital (GSM, CDMA, etc.).

Nonvolatile memory 311 may store operating system software 313, data connection software 315, data services software 317, multimedia software 319, and other software 321. Data connection software allows a user to automatically initiate and establish a data connection with another device as described above. For example, upon selecting a certain menu option, such as "connect to data device," the mobile terminal 301 may automatically establish a GPRS connection, send an SMS message containing the IP address assigned to the mobile terminal, wait and receive the return SMS message containing the IP address of the second device, and establish the data connection with the second device using the received IP addresses. A user may specify the telephone number of the device with which the mobile terminal should create a data connection, e.g., as part of a configuration process or on a settings screen, or the telephone number may be provided automatically, e.g., via network 103 or an SMS message.

Once mobile terminal 301 establishes the data connection, mobile terminal 301 may launch data services 317 to perform data operations over the GPRS data connection with the second device (e.g., email, file transfer, etc.). Mobile terminal 301 may use other software 321 for traditional mobile telephone operations, local applications such as calendar and phone book, or any other service provided by the mobile terminal. Multimedia software 319 is further described below.

While the above description describes a mobile terminal being one of the devices that is always party to the data connection, the inventive principles also work with two non-mobile devices, such as two computers equipped with SMS message and GPRS capabilities. In addition, while the above example illustrates a connection where both the first device (the mobile terminal) and the second device are connected through the same network, the inventive principles work equally as well when a mobile terminal is roaming on another operator's network (e.g., network 117 in FIG. 1). When a mobile terminal is roaming, the mobile terminal and the second device can use public IP addresses, instead of DHCP provided IP addresses or static local IP addresses, to establish the data connection. Assignment of public IP addresses is also provided for by the GPRS specification promulgated by ETSI.

The above-described method and system may be used, for example, to establish a data connection over which mobile terminal 301 can exchange data files with a home server computer 119 (FIG. 1). For example, a network-enabled mobile terminal including a digital camera presents a combined functionality mobile terminal for which it may be desirable to remotely store files, such as digital images taken with the digital camera. Thus, local memory space on the mobile terminal may be preserved for capturing additional images by storing one or more previously captured images remotely. In addition, after the images are transferred to remote storage, e.g., home server computer 119, it may be desirable to browse and view previously captured images on the mobile terminal. Thus, the above-described data connection scheme can be used to establish a data connection between the mobile terminal and the home server over which image files can be sent.

A mobile terminal may be adapted with multimedia software 319 that communicates with an I/O 309 digital camera to capture digital images and send images to a home server 119 (FIG. 1) as requested by a user or, alternatively, automatically when predefined condition are met (e.g., memory is almost full or is full beyond a predefined threshold). Multimedia software 319 may be further adapted to allow a user to browse thumbnails of images stored on the mobile terminal, and retrieve and view larger images from the home server as selected by a user. The thumbnail images may alternatively also be stored on the home server 119. As a user browses thumbnails, the mobile terminal can establish a data connection to the home server and retrieve a corresponding larger image file upon selection of a specific thumbnail by the user.

Figure 4:
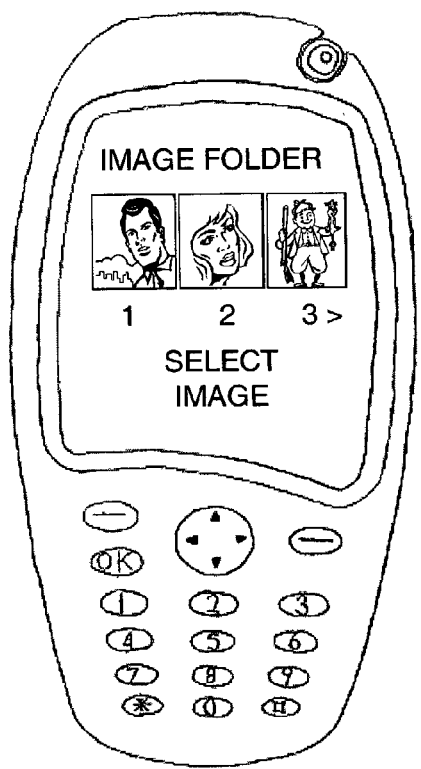
FIG. 4 illustrates a mobile terminal executing multimedia software to browse thumbnail images according to an illustrative embodiment of the invention.
Figure 5:
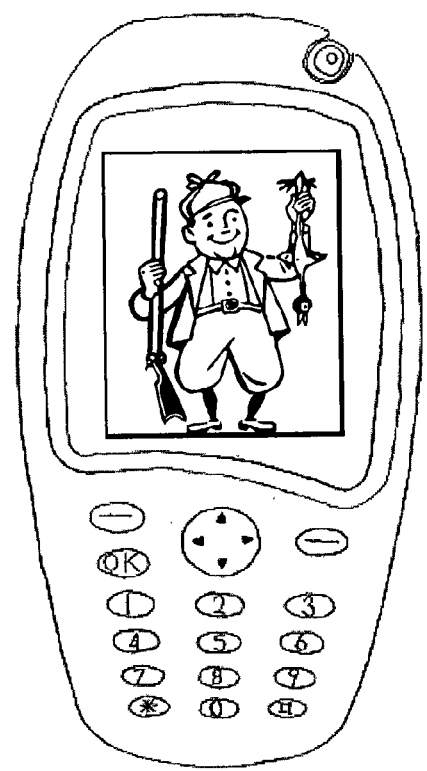
FIG. 5 illustrates a mobile terminal displaying an image file retrieved from a home server according to an illustrative embodiment of the invention.

Mobile terminal 301 may establish the IP data connection with home server 119 under the control of multimedia software 319. For example, a user may select a "multimedia" mode on the mobile terminal, in response to which the mobile terminal automatically establishes the data connection with the home server for future retrieval of requested data files. Alternatively, the multimedia software may automatically establish the data connection when the user requests a multimedia-based function, e.g., viewing image thumbnails or selecting a specific image thumbnail for which the user desires to view a larger version of the image. Once the data connection is established, the mobile terminal may maintain the data connection until the user stops viewing images. Alternatively, the mobile terminal may drop the data connection after successfully transferring the requested image, and reestablish a new connection when a subsequent image is requested. FIG. 4 illustrates a mobile terminal executing multimedia software 319 to allow a user to browse thumbnail images. FIG. 5 illustrates the mobile terminal displaying an image retrieved from a home server after the user selects thumbnail 3 from FIG. 4.

As described above in connection with FIGS. 1 and 2, according to an illustrative embodiment of the present invention a mobile terminal 101 (FIG. 1) needing to communicate with a home server 119 first establishes a GPRS connection with operator IP network 111, and as a result of successful connection establishment procedures (step 201), the mobile terminal 101 receives a dedicated IP address for communication purposes.

Upon receiving the dedicated IP address, the mobile terminal 101 sends (step 203) an SMS message including the received IP address to a home server 119 having communication means and a fixed communication identifier, such as, for example a fixed phone number. The received SMS triggers the home server 119 to also establish a GPRS connection with operator IP network 111 and as a result of successful connection establishment procedures (step 205), the home server 119 receives a dedicated IP address for communication purposes.

Upon receiving the dedicated IP address, the home server 119 sends a response SMS message back to the mobile terminal 101 including the received IP address (step 207). Upon receiving the response SMS by the mobile terminal, the mobile terminal 101 and the home server 119 may commence a direct data connection (steps 209–211) using the exchanged IP addresses.

According to another illustrative embodiment of the present invention, the home server 119 may have a fixed IP address and said address is preferably already stored within the mobile terminal 101. In this embodiment, upon receiving the SMS message including the mobile terminal's dedicated IP address, the home server 119 just sends a response SMS to the mobile terminal 101 indicating that the SMS have been received and direct data communication may be commenced thereafter.

While the invention has been described with respect to specific examples including presently preferred modes of carrying out the invention, those skilled in the art will appreciate that there are numerous other variations and permutations of the above described systems and techniques that fall within the spirit and scope of the invention, as indicated in the appended claims.

We claim:

1. A mobile terminal, comprising:
   a processor; and
   a memory for storing computer readable instructions that, when executed by the processor, cause the mobile terminal to perform a method, comprising
   (a) sending a request for a first data connection with a network;
   (b) establishing the first data connection with the network, said establishing comprising receiving from a server a first IP address corresponding to the mobile terminal and assigned by the network;
   (c) sending a first short message service (SMS) message to a second terminal device, wherein the first SMS message includes the first IP address received from the server;
   (d) receiving a second SMS message from the second terminal device, wherein the second SMS message includes a second IP address corresponding to the second terminal device; and
   (e) establishing a direct data connection with the second terminal device based on the first and second IP addresses, wherein the mobile terminal transmits data to the second terminal device over the established direct data connection.

2. The mobile terminal of claim 1, wherein the first identifier IP address comprises a local network IP address.

3. The mobile terminal of claim 2, wherein the first identifier IP address comprises a DHCP-provided IP address.

4. The mobile terminal of claim 1, wherein the first identifier IP address comprises a public IP address.

5. The mobile terminal of claim 1, wherein step (a) comprises sending a request for a general packet radio service (GPRS) connection.

6. The mobile terminal of claim 1, wherein step (a) comprises sending a request for a high-speed circuit switched data (HCSD) connection.

7. The mobile terminal of claim 1, wherein the mobile terminal automatically performs steps (a)–(e) responsive to predetermined user input.

8. The mobile terminal of claim 7, wherein predetermined user input comprises requesting a multimedia mode.

9. The mobile terminal of claim 7, wherein predetermined user input comprises selecting a thumbnail image.

10. The mobile terminal of claim 9, wherein the computer readable instructions further cause the mobile terminal to perform the step of retrieving via the data connection an image file corresponding to the selected thumbnail image from the second device.

11. A computer-implemented method for establishing a data connection between a first terminal device and a second terminal device, comprising:
   (a) sending a request for a first data connection with a network;
   (b) establishing the first data connection with the network, said establishing comprising receiving from a server a first IP address corresponding to a first terminal device and assigned by the network;

(c) sending a first short message service (SMS) message to the second terminal device, wherein the first SMS message includes the first IP address received from the server;

(d) receiving a second SMS message from the second terminal device, wherein the second SMS message includes a second IP address corresponding to the second terminal device; and (e) establishing a direct data connection between the first terminal device and the second terminal device based on the first and second IP addresses, wherein the first terminal device transmits data to the second terminal device over the established direct data connection.

12. The method of claim 11, wherein the first identifier IP address comprises a local network IP address.

13. The method of claim 12, wherein the first identifier IP address comprises a DHCP-provided IP address.

14. The method of claim 11, wherein the first identifier IP address comprises a public IP address.

15. The method of claim 11, wherein step (a) comprises sending a request for a general packet radio service (GPRS) connection.

16. The method of claim 11, wherein step (a) comprises sending a request for a high-speed circuit switched data (HCSD) connection.

17. The method of claim 11, wherein steps (a)–(e) are performed by a mobile terminal comprising the first device.

18. The method of claim 11, further comprising:
(f) displaying a plurality of thumbnail images on a display screen of the mobile terminal; and
(g) retrieving via the data connection an image file corresponding to a selected thumbnail image from the second device.

19. A computer-implemented method for a mobile terminal to establish a data connection with a data processing device, comprising:
(a) responsive to predetermined user input, sending a request via a telecommunications network to establish a GPRS connection with a data network;
(b) receiving a first IP address from a server of the data network and assigned by the data network;
(c) sending a first short message service (SMS) message to the data processing device, wherein the first SMS message includes the first IP address received from the server of the data network;
(d) receiving a second SMS message from the data processing device, wherein the second SMS message includes a second IP address corresponding to the data processing device; and
(e) establishing a direct data connection with the data processing device based on the first and second IP addresses, wherein data is exchanged on the established direct data connection with the data processing device.

20. The method of claim 19, wherein in step (a) predetermined user input comprises requesting a multimedia mode.

21. The method of claim 19, wherein predetermined user input comprises selecting a thumbnail image.

22. The method of claim 11, further comprising:
(i) detecting when a used portion of a memory in a mobile terminal meets a predetermined threshold;
(ii) responsive to step (i), automatically initiating steps (a)–(d);
(iii) sending one or more files to the second device via the data connection; and
(iv) deleting a locally stored copy of each file sent in step (c).

23. A system comprising one or more data processing devices configured to establish a data connection between first and second terminal devices by:
receiving a request for a first data connection from the first terminal device;
establishing the first data connection with the first terminal device by providing a first IP address to the first terminal device;
receiving and delivering a first SMS message from the first terminal device addressed to the second terminal device, said first SMS message comprising the first IP address;
receiving a request for a second data connection from the second terminal device;
establishing the second data connection with the second terminal device by providing a second IP address to the second terminal device;
receiving and delivering a second SMS message from the second terminal device addressed to the first terminal device, said second SMS message comprising the second IP address;
facilitating a transfer of data between the first and second terminal devices based on the first and second IP addresses.

\* \* \* \* \*

UNITED STATES PATENT AND TRADEMARK OFFICE
CERTIFICATE OF CORRECTION

PATENT NO. : 6,990,352 B2
APPLICATION NO. : 10/263193
DATED : January 24, 2006
INVENTOR(S) : Seppo Pyhälammi et al.

It is certified that error appears in the above-identified patent and that said Letters Patent is hereby corrected as shown below:

Column 8, Claim 19, Line 3:
    Replace "exchanged" with --sent--

Column 8, Claim 19, Line 4:
    Replace "with" with --to--.

Signed and Sealed this

Eleventh Day of July, 2006

JON W. DUDAS
*Director of the United States Patent and Trademark Office*